INVENTORS.
EDWARD F. WADLEY,
ROBERT D. WESSELHOFT,
BY
ATTORNEY.

United States Patent Office 3,848,009
Patented Nov. 12, 1974

3,848,009
ISOMERIZATION OF POLYMETHYLBENZENES
Edward F. Wadley and Robert D. Wesselhoft, Baytown, Tex., assignors to Esso Research and Engineering Company
Filed Dec. 16, 1970, Ser. No. 98,524
Int. Cl. C07c 5/24, 15/08
U.S. Cl. 260—668 A                    16 Claims

ABSTRACT OF THE DISCLOSURE

Polymethylbenzenes such as the xylenes, ethylbenzene, the trimethylbenzenes and the tetramethylbenzenes and the like are isomerized by contacting a non-equilibrium mixture of the polymethylbenzenes in the vapor phase at a temperature from about 700° to about 950° F. with a $MoO_3$ catalyst supported on a crystalline aluminosilicate zeolite having a composition expressed in mol ratio of oxides as follows:

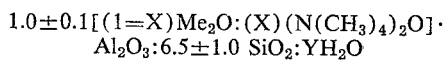

wherein X has a value of about 0.001 to about 0.2, Y may be any value from 0 to about 10, and Me is selected from the group which consists of alkali metals and mixtures of alkali metals, said zeolite having been converted to the hydrogen form to form an isomerized product, and recovering from said product a selected polymethylbenzene.

CROSS-REFERENCE TO RELATED APPLICATIONS

This application is related to Ser. No. 684,482 filed Nov. 20, 1967 and now abandoned, for Harry E. Robson, Ser. No. 31,009 filed Apr. 22, 1970, which is a C.I.P. of S.N. 684,482, Ser. No. 31,010 filed Apr. 22, 1970, for Glen P. Hamner, Harry E. Robson, and Ralph B. Mason, and Ser. No. 98,522, filed Dec. 16, 1970 for Edward Frank Wadley, Robert D. Wesselhoft, and Glen P. Hamner.

BACKGROUND OF THE INVENTION

1. Field of the Invention

The present invention is directed to isomerization of polymethylbenzenes. More particularly the invention is concerned with the isomerization of a polymethylbenzene in a non-equilibrium mixture of polymethylbenzenes. In its more specific aspect the invention is concerned with isomerization of polymethylbenzene in a non-equilibrium mixture over a $MoO_3$ catalyst supported on a specific crystalline aluminosilicate zeolite in its hydrogen form.

2. Description of the Prior Art

It has been known heretofore to form isomerization catalysts by impregnating silica-alumina with molybdenum oxide or noble metals or by using certain zeolites as the carrier for base or noble metals. One of the problems heretofore encountered is the failure of certain isomerization catalysts to convert ethylbenzene in a mixture of $C_8$ aromatic hydrocarbons to the xylenes, particularly the more valuable xylene, paraxylene which has many uses well known to the art. Likewise, the noble metal catalysts, while effective, have been quite expensive and substantial investments have been required to fill a reactor with a noble metal-containing catalyst even though only a small amount on a support is usually required. The method of the present invention is inexpensive, the catalyst is a non-noble metal and has the same advantages of the much more expensive noble metal catalysts, and ethylbenzene is no longer a problem.

Specific prior art considered in connection with this invention include the following U.S. patents:

3,410,919 (Amir et al.)
3,449,456 (Amir et al.)
3,484,385 (Amir)
"Nature" 214, June 3, 1967, pp. 1005–1006, Bennet and Gard

SUMMARY OF THE INVENTION

The present invention may be briefly described as a method of isomerizing polymethylbenzenes over a specific type of catalyst. In its more specific aspects the invention is concerned with isomerization of polymethylbenzene in a non-equilibrium mixture with other polymethylbenzenes over a base metal catalyst such as $MoO_3$ catalyst supported on crystalline aluminosilicate zeolite which has been known as offretite and more commonly phillipsite. This zeolite is a fibrous zeolite having the chemical composition $KCa(Al_3Si_3O_{16}) \cdot 6H_2O$ having cage openings of about 3 to 7 A., usually about 5 A. More particularly the invention is concerned with isomerizing a non-equilibrium mixture of polymethylbenzene by contacting same under isomerization conditions with a $MoO_3$ catalyst supported on the hydrogen form of a zeolite having the following composition expressed in terms of mol ratios of oxides:

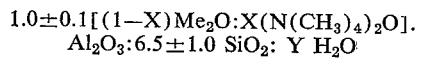

where X has a value of about 0.001 to about 0.2 and Y may be any value from 0 to about 10.

PREPARATION OF CATALYST

In preparing the catalyst, the zeolite base, either synthetic or natural is ion exchanged with an ammonium salt such as $NH_4NO_3$, $NH_4Cl$, or $(NH_4)_2SO_4$ in an aqueous solution to form the ammonium form of the zeolite. This material is then heated with ammonia being liberated, forming the hydrogen form of the base. Calcining of the base is conducted in a suitable heating system such as a furnace to a temperature from about 1000° to about 1500° F. usually about 1100° F. and held at that temperature for about 1 to about 24 hours in the presence of steam, 2 hours usually sufficing. Steaming is started at about 700° F. and the temperature is increased at a rate of about 100° F. per hour. The zeolite is then cooled to ambient temperature and is then impregnated or exchanged with an aqueous solution of ammonium paramolybdate to give a catalyst containing from about 3% to about 10% by wt. $MoO_3$ on the finished dry basis. Although these amounts of $MoO_3$ may be preferred more or less $MoO_3$ may be used with as little as 1% by weight and as much as 20% by weight being employed.

The catalyst may be formed into shapes, such as pills, pellets, cylinders or may be extruded or used in any form where good contact with the vaporous polymethylbenzenes is assured.

This molybdenum impregnated catalyst is economically advantageous over noble metal catalyst (for example, palladium) or similar supports and over base metal catalysts on silica-alumina.

The following table illustrates the advantage of the present invention over molybdenum containing catalyst supported on silica-alumina which is included in the Amir & Amir et al. patents supra:

TABLE I

| | Feed | Molybdenum on Offretite | Mo on silica-alumina (Amir) |
|---|---|---|---|
| Pressure, p.s.i.g | | 250 | 250 |
| Temperature, °F | | 800 | 750 |
| Feed rate, v./v./hr | | 2.3 | 1.1 |
| $H_2$/oil, mol ratio | | 8.5/1 | 7.2 |
| Composition: | | | |
| Gas | | 0.6 | 0.3 |
| Nonaromatics | 0.2 | 0.1 | 1.0 |
| Benzene | | 1.0 | 0.8 |
| Tolueneg | 0.1 | 2.1 | 2.5 |
| Ethylbenzene | 14.6 | 12.1 | 12.8 |
| p-Xylene | 10.0 | 19.1 | 18.4 |
| m-Xylene | 49.9 | 43.1 | 42.1 |
| o-Xylene | 25.1 | 19.9 | 18.9 |
| $C_9$ aromatics | 0.1 | 1.7 | 2.4 |
| $C_{10}$ aromatics | | 0.3 | 1.0 |
| EB loss, percent | | 16.9 | 11.7 |
| Xylene loss, percent | | 3.4 | 6.6 |
| R/R | | 5.0 | 1.8 |
| $K_x$ of product | | 23.3 | 23.2 |

In the foregoing table EB is ethylbenzene and R/R is the reduction ratio of the percentage loss of ethylbenzene to the percentage loss of xylene while $K_x$ of the product equals the percent of the selected isomer divided by the percent of the selected isomer plus the sum of the percent of other isomers. In the case of isomerization of xylene the percent $K_x$=approximately 24 for paraxylene.

It has been found beneficial to treat the catalyst with a free oxygen-containing gas such as air at a temperature from about 850° F. to about 950° F. for a time within the range from about 1 to about 24 hours prior to contact of the catalyst with the selected polymethylbenzene. This results in a shorter induction period during which undesirable side reactions gradually drop to an acceptable level.

BRIEF DESCRIPTION OF THE DRAWINGS

The present invention will be further illustrated by reference to the drawing in which:

Referring now to FIG. 1, an isomerization operation using the catalyst prepared as described was started up in an isomerization run in accordance with the prior art as illustrated in the Amir et al. and Amir patents supra with the system being pressured with hydrogen before it was heated.

The ammonium salt decomposes at about 600° F. in a hydrogen atmosphere and the molybdena is at least partially reduced. FIG. 1 shows a high level of side reactions relative to the isomerization reaction (equilibrium $K_x$=24.0). It will be noted that the side reactions dropped with time so that at 500 hours they were at an acceptable level with respect to $K_x$ compared with the Amir catalyst. The Reduction Ratio (RR) (EB reduction/xylene reduction gradually increased to about 3.5/1.

FIG. 2 shows the superior results obtained when the catalyst shown in FIG. 1 was regenerated in the presence of air. The regeneration temperature was 850° F. maximum. The by-product reactions were initially very high but dropped within 50 hours to an acceptable level and at 150 hours the operation was superior to the fresh catalyst in FIG. 1. The reduction ratio was 5.2—a very desirable level while $K_x$ was 22.9 and the total disproportionation was 4.5. The product at that point was very satisfactory but the temperature was raised to 825° F. to increase the $K_x$ value. As the figure shows, $K_x$ reached 22.3 and the catalyst was reaching a stable activity level.

Since the regeneration produced a superior result, a fresh catalyst run was started with air pretreatment at 900° F. FIG. 3 illustrates results which closely approximate the results of FIG. 2, demonstrating that the long induction period shown in FIG. 1 may be eliminated by air pretreatment.

Referring now to FIG. 4 of the drawing, numeral 11 designates an isomerization catalyst reactor containing a body of catalyst 12. Air and/or steam may be introduced by line 13 controlled by valve 14 when and if regeneration is required, and the discharged air and/or steam is withdrawn by line 15 controlled by valve 16. When a regeneration operation is conducted, valve 17 in line 18 remains closed.

Figure 1:
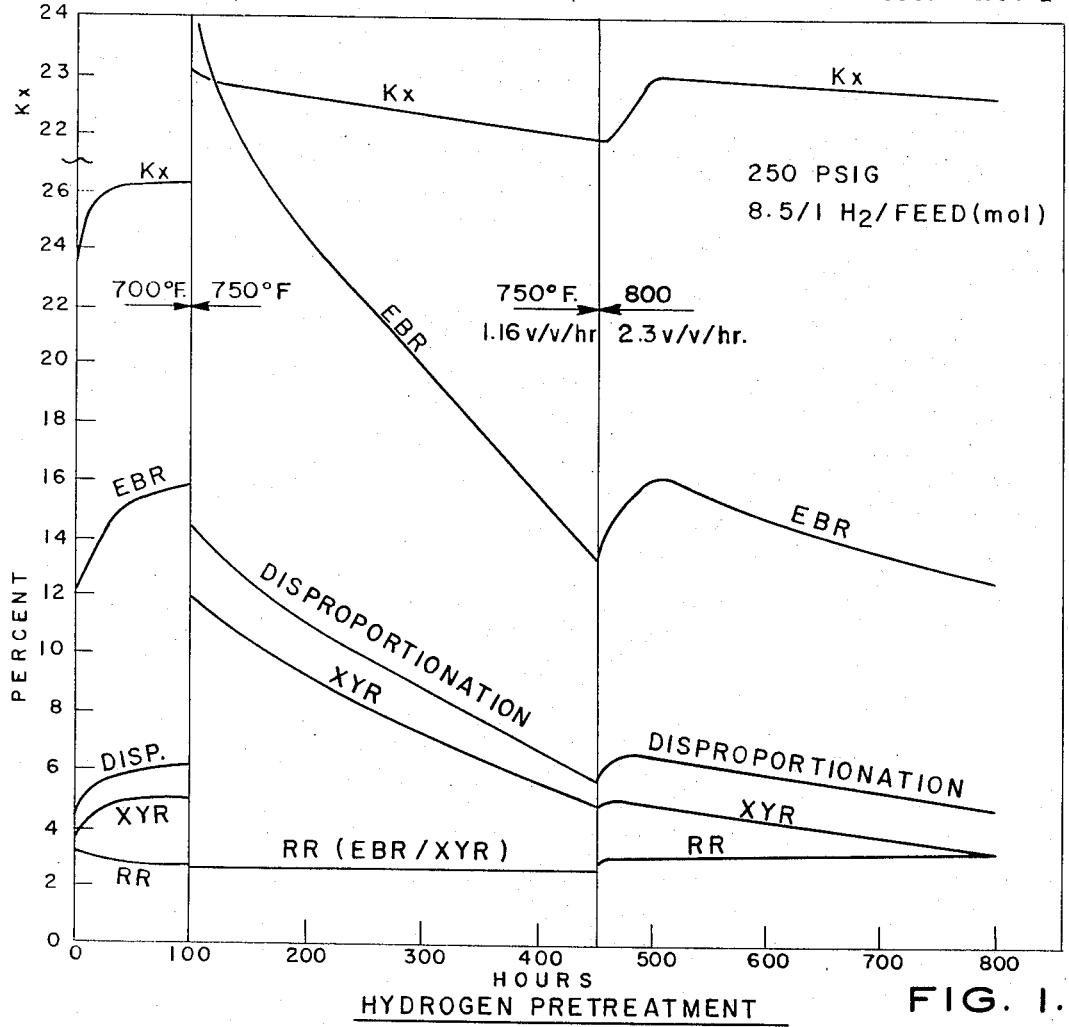
FIG. 1 illustrates a hydrogen pretreatment startup operation with the catalyst of the present invention.
Figure 4:
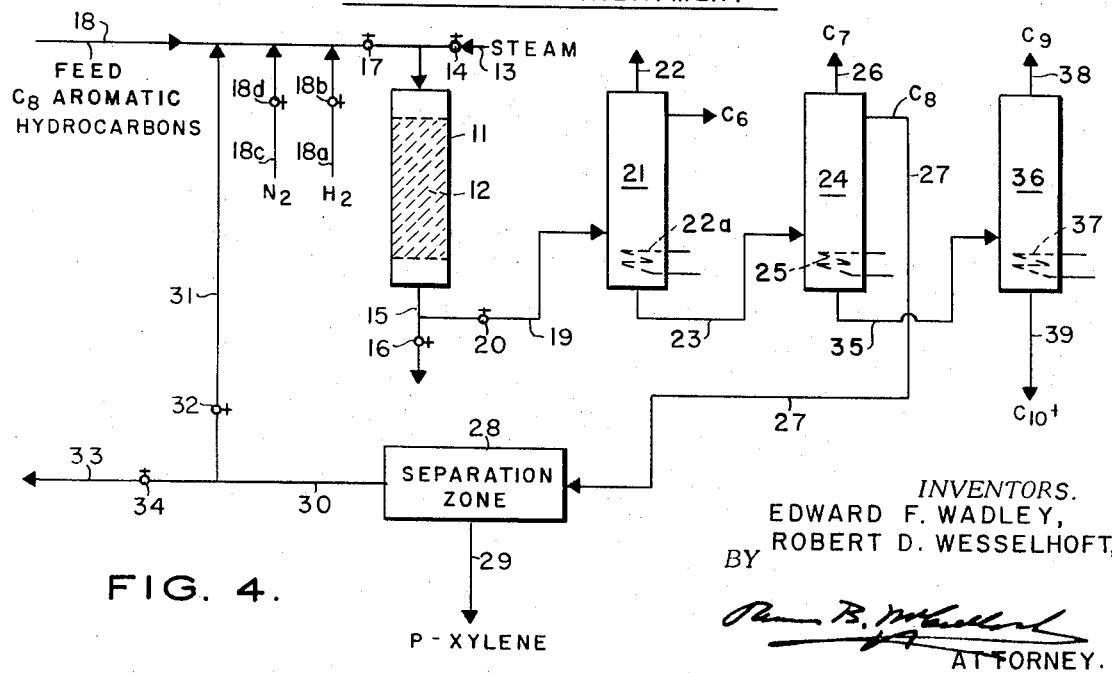
FIG. 4 is a flow diagram of a preferred mode.

The particular zeolites described herein have been converted to the hydrogen form by combination of treatment of the aqueous solution of ammonium salts of molybdenum followed by steaming to form the hydrogen zeolite which is then impregnated with an aqueous solution of ammonium paramolybdate. After the catalyst has been suitably formed and loaded in reactor 11, the valves 14 and 16 are closed and valve 17 in line 18 is open. Polymethylbenzene feed such as a $C_8$ fraction which may contain ethylbenzene, para-, meta-, and ortho-xylene and other $C_8$ aromatics in a non-equilibrium ratio is introduced by line 18 into the reactor 11 in contact with the bed or body 12 of the catalyst. Hydrogen and/or nitrogen, respectively, may be introduced into line 18 by line 18a controlled by valve 18b and line 18c controlled by valve 18d. Suitable means not shown are provided for maintaining the proper temperature in the reactor.

Under the conditions set out herein the $C_8$ polymethylbenzenes or any other polymethylbenzenes such as $C_9$, $C_{10}$ and the like which will include the trimethylbenzenes and tetramethylbenzenes as well as other members of the same homologous series are introduced to isomerization reactor 12 under the conditions stated herein.

The isomerizate is withdrawn from the reactor 11 by line 19 controlled by valve 20, valve 16 being closed and the isomerizate introduced into a distillation zone 21 which is suitably a fractional distillation zone equipped with vapor-liquid contact means such as but not limited to bellcap trays and the like, and is provided with a heating means illustrated by steam coil 22 but which suitably may be a pump-around furnace or other heating means. Temperatures are adjusted in zone 21 to remove overhead gaseous material by line 22 which may be recycled to line 18 or discarded as may be desirable. The $C_7$ or heavier aromatic hydrocarbons are withdrawn from zone 21 by line 23 and introduced thereby into zone 24 which is similarly equipped to zone 21 and is provided with a heating means such as steam coil 25 and bell cap trays not shown. A $C_7$ fraction which is toluene may be withdrawn by line 26 and used as such while a $C_8$ fraction is withdrawn by line 27 and discharged thereby into a separation zone 28 which is suitably a fractional crystallization zone and may comprise distillation towers as well as fractional crystallization facilities to separate paraxylene and other isomers; paraxylene is the preferred isomer, and it may be withdrawn by line 29 for use as may be desired while the other isomers such as ortho- and meta-xylenes may be separated by distillation by means not shown with the ortho-xylene recovered while the meta-xylene is recycled by line 30 and branch line 31 controlled by valve 32 to line 18 for further treatment.

It may be desirable to withdraw the meta- and ortho-xylenes. In this case this may be accomplished by opening valve 33 controlled by valve 34.

It is to be understood that while separation zone 29 is described as a crystallization and distillation operation, it suitably may be other separation means such as known in the art including chromatographic separations and adsorption and desorption from suitable zeolites.

The $C_9$ and $C_{10}$ and heavier aromatic hydrocarbons are withdrawn from zone 24 by line 35 and introduced thereby into fractional distillation zone 36 which is equipped similarly to zones 21 and 24 and is provided with a heating means 37 by means of which the heat is adjusted allowing a $C_9$ fraction to be removed by line 38 and a $C_{10+}$ fraction by line 39.

It is to be understood that $C_9$ and other fractions may be recycled to line 18 as may be desired and separately recovered.

From the foregoing descriptions of several runs and the disclosure, it is clear that improved and unobvious results are obtained by isomerizing polymethylbenzene under the conditions specified. This is an unobvious and improved result particularly since other zeolites on which molybdenum oxide was deposited were completely inactive even though the same treatment and conditions were employed.

Isomerization Conditions

While typical isomerization conditions are given in Table I, the following range of conditions is suitable and may be employed.

Pressure, p.s.i.g.: 150–500 (vapor phase)
Temperature, ° F.: 700–950
Feed Rate v./v./hour: 1–10
$H_2$/Oil, Mol Ratio: about 6–10:1
$N_2$ Mol percent in total gas: about 1–4%

It is desirable and useful to employ hydrogen and nitrogen during the isomerization operations as described in the prior art.

Heat Treatment Conditions of Catalyst

Temperature, ° F. _____ 850–950
Time, hours _____ 1–24
Free-oxygen containing gas, v./v./hour _____ 1.5–3.0

Figure 2:
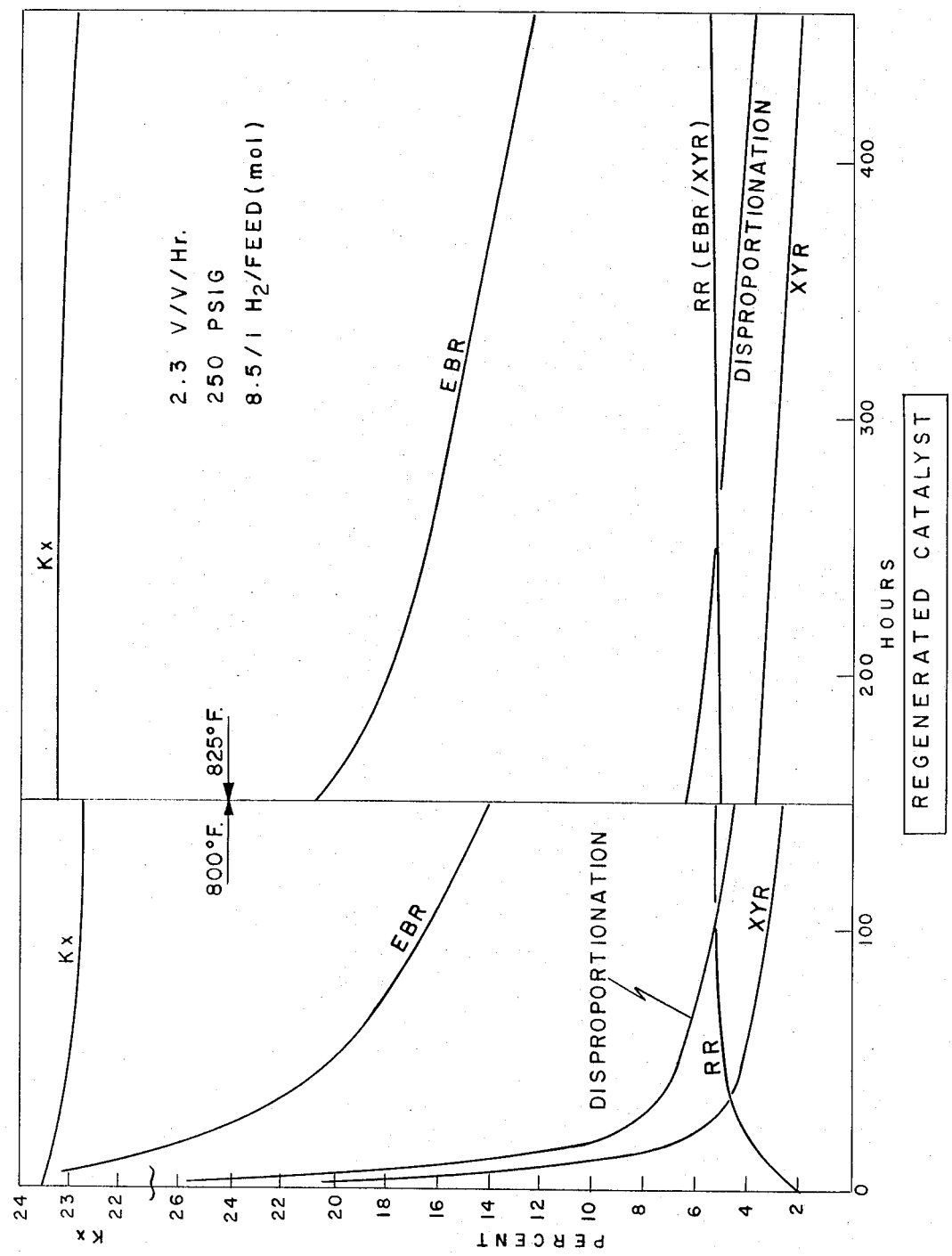
FIG. 2 illustrates superior results obtained when the catalyst of FIG. 1 is regenerated.
Figure 3:
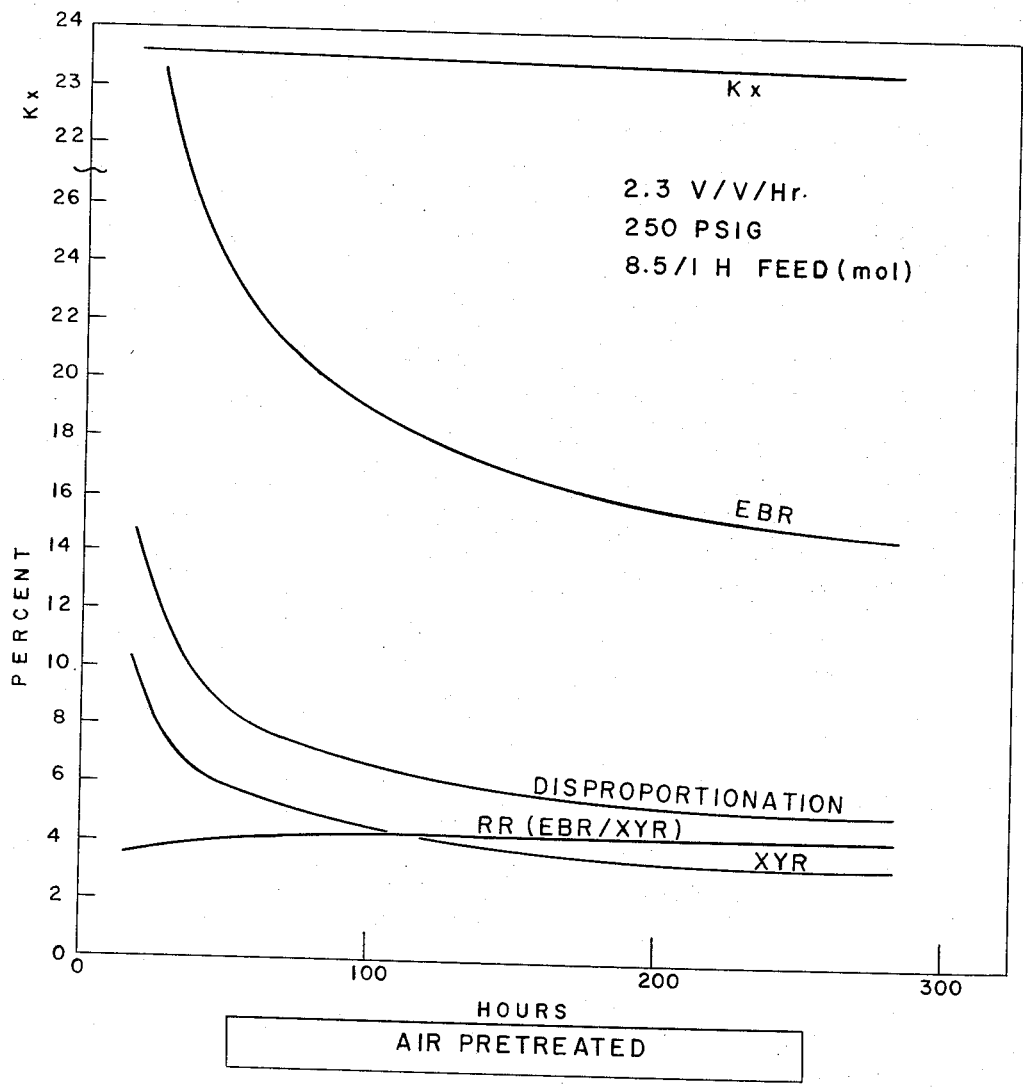
FIG. 3 illustrates results where the fresh catalyst of the present invention was employed demonstrating that the long induction period in FIG. 1 may be eliminated by air pretreatment.

The heat treatment may be either a regeneration treatment or an initial heat treatment such as has been illustrated in FIGS. 1 and 2. In some cases both initial heat treatment and regeneration may be used and such may be preferred during extended operations.

The selected isomer such as paraxylene is separated from the isomerizate by chilling and/or other means. Thus, a combination of crystallization and distillation may be used with distillation being employed to remove ortho-xylene from the other $C_8$ isomers. The other polymethylbenzenes may be separated in a similar manner although we do not limit ourselves to separation by crystallization and/or distillation since other separation means for polymethylbenzenes are known. While the invention has been described and illustrated by reference to non-equilibrium mixtures of $C_8$ polymethylbenzenes, it is equally applicable to other non-equilibrium aromatic hydrocarbons such as the $C_9$ and $C_{10}$ polymethylbenzenes.

The nature and objects of the present invention having been fully described and illustrated and the best modes and embodiments contemplated set forth what we wish to claim as new and useful and secure by Letters Patent is:

1. A method for producing a selected dimethylbenzene from a mixture of isomers of said selected dimethylbenzene containing ethylbenzene wherein the ratio of dimethylbenzene isomers is other than an equilibrium ratio which comprises contacting said dimethylbenzene mixture at a temperature from about 700° F. to about 950° F. in the vapor phase at a feed rate of about 1.0 to 10.0 v./v./hour the presence of the hydrogen at a hydrogen-to-oil mol ratio of about 6.0 to about 10 to 1 with a molybdenum oxide of offretite having the formula $$(KCa(Al_3Si_3O_{16}) \cdot 6H_2O)$$

catalyst, said offretite having been treated with ammonium salt and heated to form the hydrogen form followed by cooling and impregnation with ammonium molybdate to form on drying said molybdenum oxide on offretite catalyst, to form an isomerized product containing ethylbenzene and recovering said selected dimethylbenzene from said isomerized product.

2. A method in accordance with claim 1 in which the mixture of isomers comprises a mixture of xylenes and ethylbenzene and the selected dimethylbenzene is paraxylene.

3. A method in accordance with claim 1 in which the selected dimethylbenzene is recovered from the isomerized product by crystallization.

4. A method in accordance with claim 1 in which the catalyst before use in said isomerization is treated with a free oxygen-containing gas at an elevated temperature for a time within the range of about 1 to about 24 hours.

5. A method in accordance with claim 1 in which the catalyst is treated at an elevated temperature with a free oxygen-containing gas and in which the elevated temperature is within the range of 800° F. to 950° F.

6. A method in accordance with claim 1 in which the catalyst is treated with a free oxygen-containing gas and the free oxygen-containing gas is air and the treatment is conducted for a period of time of at least about 1 hour at a temperature of about 800° F. at a rate of about 1.5 to 3.0 v./v./hour and said treatment is conducted before and after said isomerization.

7. A method in accordance with claim 1 in which:
(a) the ammonium salt is $NH_4Cl$;
(b) the ammonium offretite is heated in the presence of steam to a temperature within the range of about 900° F. to about 1500° F. and at a rate of about 50–100° F. per hour;
(c) the hydrogen form of the offretite is held in the presence of steam at 900–1500° F. for 1–2 hours; and
(d) the hydrogen form of the offretite is cooled in the presence of steam to a temperature within the range of about 100° F. to about 180° F. at a rate of about 50° F. to about 100° F. per hour.

8. A method in accordance with claim 1 in which the isomers of dimethylbenzene contacted with the catalyst contain from 8 to 10 carbon atoms.

9. A method for isomerizing a mixture of xylenes and ethylbenzene in a ratio other than an equilibrium ratio which comprises contacting said mixture under isomerization conditions in the presence of hydrogen with a catalyst comprising $MoO_3$ supported on offretite, said offretite having been converted to the hydrogen form, to form an isomerized product containing paraxylene and ethylbenzene and recovering from said product said paraxylene.

10. A method in accordance with claim 9 in which the mixture of dimethylbenzene consists essentially of ortho- and meta-xylene.

11. A method in accordance with claim 9 in which the isomerization conditions include
(a) vapor phase;
(b) a temperature within the range of about 700° to about 950° F.;
(c) a feed rate of about 1 to about 10 v./v./hour.

12. A method in accordance with claim 9 in which the catalyst is treated at an elevated temperature with a free-oxygen containing gas.

13. A method in accordance with claim 12 in which the treatment is conducted before contact with said mixture.

14. A method in accordance with claim 12 in which the treatment is conducted before and after contact with said mixture.

15. A method in accordance with claim 9 in which the elevated temperature is within the range of about 800° to about 900° F.

16. A method in accordance with claim 1 wherein said offretite is synthetically formed.

References Cited

UNITED STATES PATENTS

| | | | |
|---|---|---|---|
| 3,449,456 | 6/1969 | Amir et al. | 260—668 A |
| 3,578,723 | 5/1971 | Bowes et al. | 260—668 A |
| 3,119,886 | 1/1964 | Smeykal et al. | 260—668 A |
| 3,548,017 | 12/1970 | Hebert et al. | 260—668 A |
| 3,575,846 | 4/1971 | Hamner et al. | 252—455 Z |
| 3,582,497 | 6/1971 | Best et al. | 252—455 Z |
| 3,578,398 | 5/1971 | Jenkins | 423—328 |
| 3,687,839 | 8/1972 | Jenkins | 252—455 Z |
| 3,700,744 | 10/1972 | Berger et al. | 260—668 A |

CURTIS R. DAVIS, Primary Examiner

U.S. Cl. X.R.

260—672 T